United States Patent [19]

Katerba

[11] Patent Number: 5,052,687
[45] Date of Patent: Oct. 1, 1991

[54] GOLF FLAGSTICK MEASURING DEVICE

[76] Inventor: Greg C. Katerba, P.O. Box 20391, Graeagle, Calif. 96103

[21] Appl. No.: 577,557

[22] Filed: Sep. 5, 1990

[51] Int. Cl.⁵ .................. G09F 17/00; G01C 22/00; A63B 57/00
[52] U.S. Cl. .................... 273/34 R; 116/173; 33/781; 273/32 B
[58] Field of Search ............... 273/34 R, 34 A, 34 B, 273/32 R, 32 H, 162 R, 162 F, 32 R, 32 B; 33/781, 782, 779, 780; 116/173, 174, 175

[56] References Cited

U.S. PATENT DOCUMENTS 2,041,119  5/1936  Duganne ................. 273/21
3,696,510 10/1972  Evans ..................... 33/781

Primary Examiner—George J. Marlo
Attorney, Agent, or Firm—Richard C. Litman

[57] ABSTRACT

A golf flagstick with an attached digital odometer wherein the odometer is placed at the top of the flagstick. When the distance between a golf ball and a hole is to be determined, the flagstick is removed from the hole, turned upside down, and wheeled between the golf ball and hole. As the wheel of the odometer is rolled along the green, the distance is recorded and displayed by a digital display. A writing pad can also be attached to the flagstick so that scores, distances and other appropriate data can be recorded.

5 Claims, 1 Drawing Sheet

U.S. Patent / Oct. 1, 1991 / 5,052,687

GOLF FLAGSTICK MEASURING DEVICE

FIELD OF INVENTION

This invention relates generally to golf flagsticks, and more particularly to an improved golf flagstick which contains an integral measuring device and means to write down appropriate data while playing golf.

BACKGROUND OF THE INVENTION

In the game of golf, especially golf tournaments, it is common for one of the par three holes to have a "closest to the hole" competition. In this type of contest the player nearest to the hole on their first shot wins. The need for an accurate means to measure the distance between the hole and the ball has long been addressed. The most common method is to use a tape measure, either of the folding or reel type. While these tape measures are functional they contain some inherent disadvantages. They can break, become misplaced and can be stolen. The need has arisen for a method and device for measuring distances on the green of a golf course. It follows that any system that is easy to use, is resistant to theft and eliminates the possibility of misplacement will present a unique advancement of the art.

DESCRIPTION OF THE RELATED ART

The broad concept of golf course markers with a measuring device is generally known. U.S. Pat. No. 2,041,119 issued to Charles G. Duganne discloses a golf course marker with an attached measuring device. In one embodiment of this invention a folding rule is attached to the marker, and is unfolded to measure the distance to the hole. In a second embodiment a reel tape is placed at the bottom of the pole near the hole. To measure the distance to a ball the tape is simply unreeled. A disadvantage to this type of device is that, to read the distance one of the players must go to the flagstick, or commonly referred to as the pin. The zero of the tape is held at the ball and the distance is read at the pin, which results in the need for two people.

U.S. Pat. No. 3,696,510 issued to Wallace D. Evans, Jr. discloses a measuring wheel of the type similar to that used in the present invention. The similarity lies in that an incremental display is located adjacently to a measuring wheel.

None of the above listed patents are seen to disclose the specific arrangement of concepts disclosed by the present invention.

SUMMARY OF THE INVENTION

By the present invention, an improved golf flagstick with an integral measuring device is provided. Everything needed to measure the distance to the ball, and to record appropriate data is secured to the flagstick. The measuring device is typically a digital odometer which is screwed onto the top of the flagstick. A collar is secured about the middle portion of the flagstick and a writing pad is removably attached to the collar. When a measurement is desired, the flagstick is removed from the hole, inverted and, with the wheel of the odometer placed on the grass, wheeled between the ball and hole. The distance traveled will automatically be displayed by the odometer. A reset button is provided to set the odometer back to zero, and ready it for the next measurement.

Accordingly, one of the objects of the present invention is to provide an improved golf flagstick with an integral measuring device.

Another object of the present invention is to provide a golf flagstick with an integral measuring device and writing pad all attached to and supported by the flagstick.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 2:
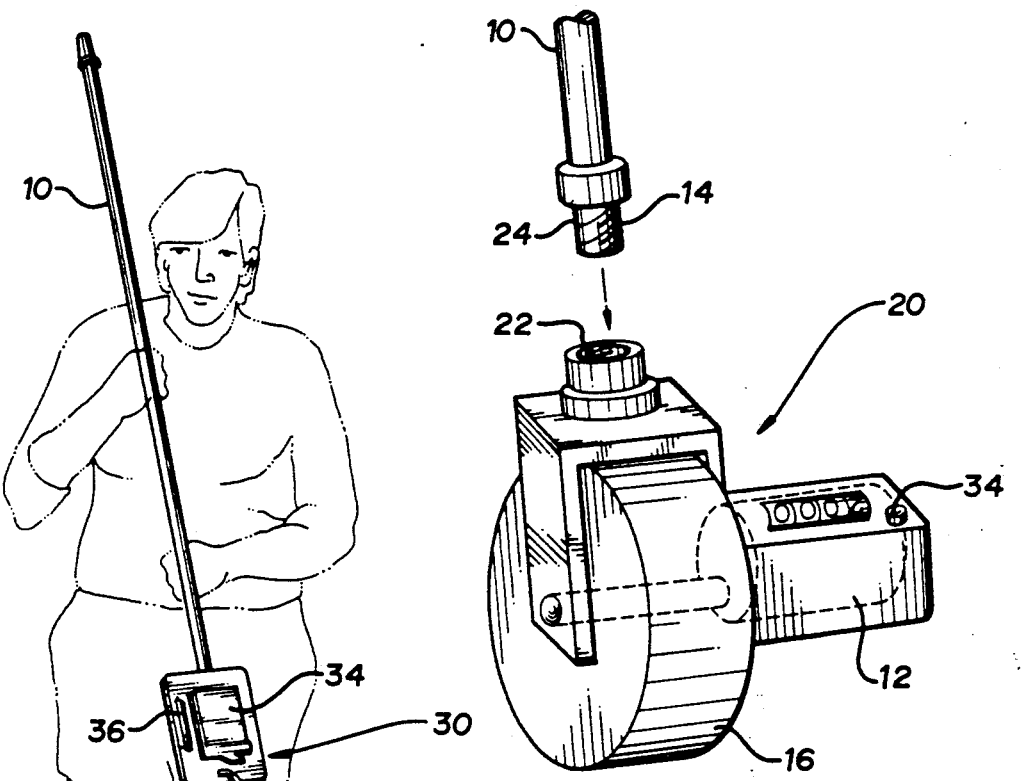
FIG. 2 is a perspective view of the measuring device.
Figure 1:
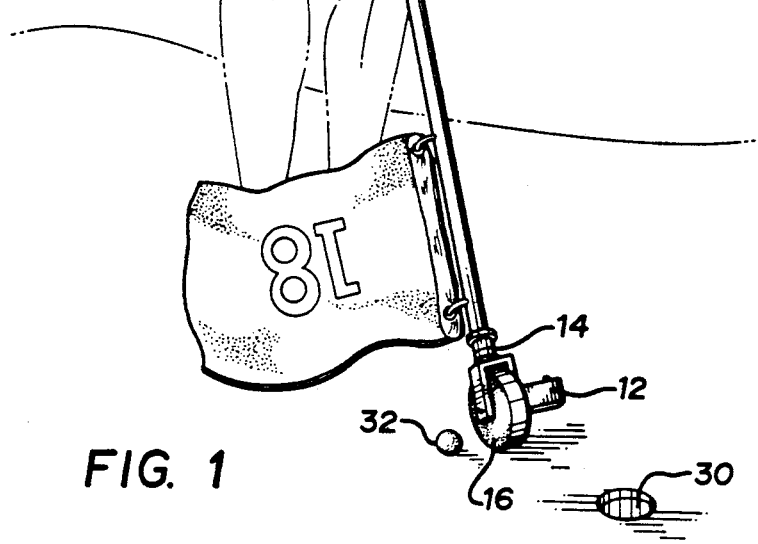
FIG. 1 is an environmental perspective view of the golf flagstick with the measuring device and writing pad.

Referring now the drawings, particularly FIG. 1, the present invention will be understood to relate to a golf flagstick with an integral measuring device. The golf flagstick 10 is of the usual type, with a digital odometer 12 attached at the very top 14 of the flagstick 10. The odometer, generally referred to as 20 is comprised of a digital readout 12 and a wheel 16. The odometer is attached to the top 14 of the flagstick 10 via a female threaded cavity 24 and a male threaded member 24. The advantage to this type of mounting arrangement is that no modification is necessary to the golf flagstick 10. The male threaded portion 24 is already present on existing golf flagsticks.

The odometer 20 is permanently kept on the top of the golf flagstick 10. Therefore a convenient and accurate measuring device is ready when golfers approach the green. A writing pad 30 can also be provided on the golf flagstick 10. A fastening device 32 clamps around the golf flagstick 10 and clips onto the writing pad 30. Material to record appropriate data, such as, paper 34 and pencil 36, are fastened to the writing pad 30. Players names, scores and distances can be recorded for later evaluation. The fastener 32 is provided with a releasable clip that allows the writing pad 30 to be removed from the golf flagstick 10. A U-shaped resilient clip can be provided on the back of the writing pad 30 to secure the writing pad when the golf flagstick 10 is turned upside down.

The device of the present invention would be used whenever a golfer would like to measure the distance between his ball and the hole. Typically this occurs during "closest to the hole" contests. In a contest of this type whoever places their ball nearest the hole on their first shot wins the contest. After the group has teed off, typically a group of two to four people, the group will travel to the green and measure who's ball is the closest. To measure a distance the flagstick 10 is removed from the hole 30, turned upside down as shown in FIG. 1, and placed on the green at the hole 30 or at the ball 32. The flagstick 10 is then wheeled between the ball and hole. As the distance is traveled, the digital readout 12 will automatically display the distance traveled by wheel 16. When the total distance has been traveled, the distance between the ball 32 and hole 30 can be read from digital display 12. A reset button 34 is provided to reset the digital display 12 back to zero.

It is to be understood that the present invention is not limited to the sole embodiment described above, but encompasses any and all embodiments within the scope of the following claims.

I claim:

1. A golf flagstick with a measuring device comprising:

an odometer fastened to the top of said golf flagstick, said odometer including a wheel and a digital display adjacent to said wheel;

whereby when a distance is to be measured, said golf flagstick is removed from a hole, turned upside down and wheeled between a golf ball and said hole, wherein said distance is displayed by said digital display.

2. The golf flagstick with a measuring device according to claim 1 including:

a collar attached to said golf flagstick;

a writing support removably attached to said collar, said writing support for holding a writing pad and pencil for recording appropriate data acquired while playing golf.

3. A golf flagstick with a measuring device comprising:

a wheel having a rim portion and a hub portion;

a counter mechanism rotatably secured to said hub portion and being adapted to record the revolving movement of said wheel;

golf flagstick attaching means, wherein said wheel and said counter mechanism are attached to said golf flagstick by said golf flagstick attaching means.

4. The golf flagstick with a measuring device according to claim 3 including:

writing means attached to said gold flagstick, wherein said writing means are for recording data obtained while playing golf.

5. The golf flagstick with a measuring device according to claim 3 wherein said measuring device is attached to the top of said golf flagstick.

* * * * *